(12) United States Patent
Mohaban

(10) Patent No.: US 8,503,461 B2
(45) Date of Patent: *Aug. 6, 2013

(54) MEDIA PATH OPTIMIZATION FOR MULTIMEDIA OVER INTERNET PROTOCOL

(75) Inventor: Shai Mohaban, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 12/839,234

(22) Filed: Jul. 19, 2010

(65) Prior Publication Data

US 2010/0284399 A1    Nov. 11, 2010

Related U.S. Application Data

(63) Continuation of application No. 10/995,982, filed on Nov. 18, 2004, now Pat. No. 7,760,744.

(60) Provisional application No. 60/524,168, filed on Nov. 20, 2003.

(51) Int. Cl.
    *H04L 12/56* (2006.01)
(52) U.S. Cl.
    USPC ............................ 370/401; 370/389; 370/392
(58) Field of Classification Search
    USPC ......................................... 370/389, 392, 401
    See application file for complete search history.

(56) References Cited

U.S. PATENT DOCUMENTS

| | | | |
|---|---|---|---|
| 6,865,613 B1 | 3/2005 | Millet et al. | |
| 6,874,084 B1 | 3/2005 | Dobner et al. | |
| 6,967,995 B1 | 11/2005 | Hwang et al. | |
| 7,085,267 B2 | 8/2006 | Carey et al. | |
| 7,245,622 B2 | 7/2007 | Huitema | |
| 7,333,500 B2 | 2/2008 | Roshko | |
| 7,417,982 B2 | 8/2008 | Jain et al. | |
| 7,483,437 B1 | 1/2009 | Mohaban | |
| 7,760,744 B1 | 7/2010 | Mohaban | |
| 2002/0095599 A1 | 7/2002 | Hong et al. | |
| 2003/0014691 A1 | 1/2003 | Abdelilah et al. | |
| 2003/0037132 A1 | 2/2003 | Abdollahi et al. | |
| 2003/0174648 A1* | 9/2003 | Wang et al. | 370/235 |
| 2003/0233471 A1 | 12/2003 | Mitchell et al. | |
| 2003/0235183 A1 | 12/2003 | Skelton et al. | |
| 2004/0024879 A1 | 2/2004 | Dingman et al. | |
| 2004/0034793 A1 | 2/2004 | Yuan | |
| 2004/0181695 A1 | 9/2004 | Walker | |
| 2004/0190549 A1 | 9/2004 | Huitema | |
| 2005/0039051 A1 | 2/2005 | Erofeev | |
| 2007/0192508 A1 | 8/2007 | Sollee | |
| 2007/0299939 A1 | 12/2007 | Johnston | |
| 2009/0205039 A1 | 8/2009 | Ormazabal et al. | |

* cited by examiner

*Primary Examiner* — Jay P Patel
(74) *Attorney, Agent, or Firm* — Shumaker & Sieffert, P.A.

(57) ABSTRACT

Methods for optimizing the media path between multimedia endpoints in a network are described. One embodiment allows avoiding having to relay the media traffic through a central device, such as a border controller's media controller element, and lets endpoints communicate directly under various conditions.

15 Claims, 9 Drawing Sheets

MEDIA PATH OPTIMIZATION FOR MULTIMEDIA OVER INTERNET PROTOCOL

CROSS-REFERENCE TO RELATED APPLICATIONS; PRIORITY CLAIM

This application is a continuation of application Ser. No. 10/995,982 now U.S. Pat. No. 7,760,744, filed Nov. 18, 2004, which claims the benefit of U.S. Provisional Application No. 60/524,168, filed Nov. 20, 2003, the entire contents of each being hereby incorporated by reference for all purposes as if fully set forth herein. This application is related to application Ser. No. 10/993,665 now U.S. Pat. No. 7,483,437, filed Nov. 18, 2004, entitled "METHOD OF COMMUNICATING PACKET MULTIMEDIA TO RESTRICTED ENDPOINTS," of inventor Shai Mohaban, the entire contents of which is hereby incorporated by reference as if fully set forth herein.

FIELD OF THE INVENTION

The present invention relates generally to transmission of multimedia over Internet protocol (MoIP) networks, and more specifically to such networks where a session border controller is used to facilitate media traffic between multimedia endpoints.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Carriers providing multimedia over IP services often use session border controllers for various reasons including security, remote (far-end) NAT traversal, topology hiding, compliance with the Communications Assistance for Law Enforcement Ace (CALEA), Call Admission Control, and others. A Session Border Controller usually deals with both signaling (by interacting with a Signaling Controller [SC] subsystem) and media (by interacting with a Media Controller [MC] subsystem). In the general case the SC often manipulates multimedia signaling to cause the subsequent media streams to flow through the MC. While some applications, such as CALEA, mandate this behavior, in many other applications, such as hosted NAT traversal, it is better not to have all the media flow through the MC, e.g. for traffic engineering reasons.

Certain proposals call for adding intelligence into the multimedia endpoints, and supporting protocols such as STUN and frameworks such as ICE. STUN is defined in Internet Engineering Task Force (IETF) Request for Comments (RFC) 3489. ICE is defined in an IETF "internet-draft" that is available at the time of this writing in the "internet-drafts" folder of the domain "ietf.org" on the World Wide Web. However, many standard multimedia endpoints do not have any such embedded intelligence. Therefore, there is a need in this field to provide ways to manipulate multimedia signaling without requiring multimedia endpoints to incorporate such embedded intelligence.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5-1, FIG. 5-2, FIG. 5-3, FIG. 5-4, and FIG. 5-5 are flowcharts of example methods for optimizing the media path between two endpoints under various conditions.

DETAILED DESCRIPTION

A. Overview

Figure 1:
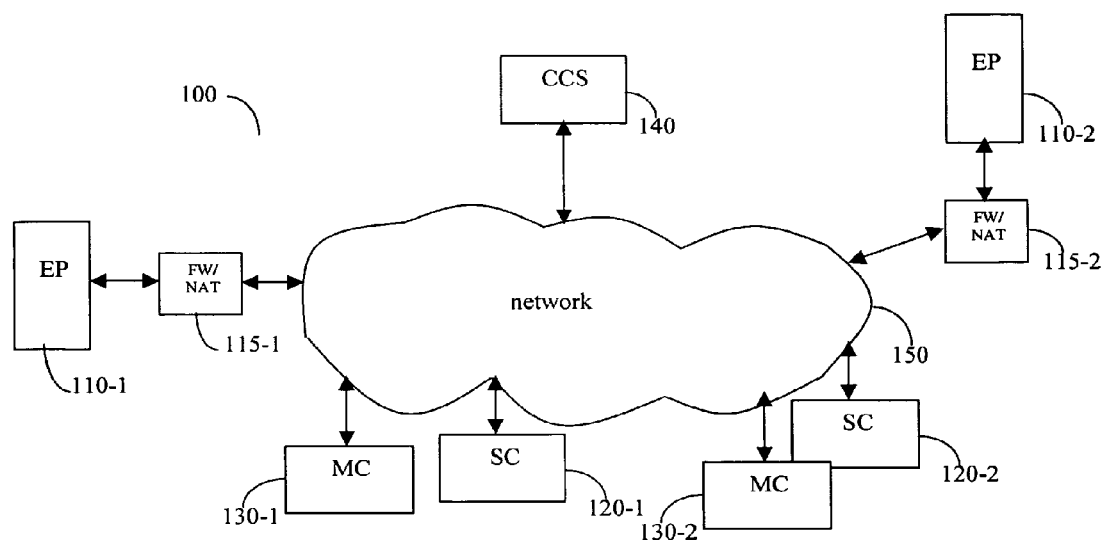
FIG. 1 is a schematic block diagram of a MoIP network configured in accordance with an embodiment.

Media path optimization for multimedia over Internet Protocol is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The needs identified in the foregoing Background, and other needs and objects that will become apparent for the following description, are achieved in the present invention, which comprises, in one aspect, a method for optimizing the media path between multimedia endpoints in a network are described. One embodiment allows avoiding having to relay the media traffic through a central device, such as a border controller's media controller element, and lets endpoints communicate directly under various conditions. In one aspect, a data processing method comprises receiving a first signaling packet from a first endpoint located in a voice-over-Internet-Protocol (VoIP) network; determining, based on the signaling packet, first information specifying whether the first endpoint is logically located behind a firewall or network address translation (FW/NAT) device; determining, based on the signaling packet and additional packets, second information specifying a type of FW/NAT device behind which the first endpoint is located; receiving a signaling packet containing a Session Description Protocol (SDP) message from the first endpoint and directed towards a second endpoint; re-configuring, based on the first information, second information, and the signaling packet, any one of the first endpoint, second endpoint, one or more signaling and media controllers, and the FW/NAT device to permit communicating media between the first endpoint and the second endpoint.

In another aspect, an apparatus for handling and directing packets received from multimedia entities that are behind local firewall/NAT devices is provided.

In yet another aspect, the invention provides a method and apparatus for letting endpoints and other entities behind firewall/NAT devices communicate with servers and other entities using standard multimedia signaling and media protocols.

In a further aspect, the invention provides a method for relaying media packets for multimedia entities which cannot communicate directly because of the NAT/firewall devices in front of them.

In still another aspect, a method for allowing multimedia endpoints and call control servers residing in disparate networks to communicate to one another, while maintaining the network topology, connectivity and security, is provided.

Yet other aspects provide a method to detect whether a multimedia endpoint is behind a firewall/NAT device, a method to detect the type of the remote FW/NAT a multimedia endpoint is behind, and multiple methods to allow multimedia endpoints to send media directly without using a relay apparatus.

In still further aspects, the invention encompasses a computer apparatus and a computer-readable medium configured to carry out the foregoing steps and to implement the foregoing aspects.

In view of the limitations of the prior art, methods for optimizing the media path and preventing the need to relay media through the MC are disclosed. Embodiments allow the SC, in some cases with the assistance of the MC, to identify numerous scenarios where media can flow directly between endpoints, and act so the media is not relayed through an MC.

Techniques that enable direct media communication are described. The description then discloses an example method to use the techniques to optimize the media communication between the endpoints. The description focuses on SIP as a signaling protocol, but the techniques herein are applicable to other multimedia signaling protocols, such as MGCP and MEGACO/H.248.

Different techniques presented herein may be used depending on whether an endpoint is behind a FW/NAT or not, the type of FW/NAT, and whether a source endpoint has a direct (IP) route towards a destination endpoint.

In general, the approaches for media path optimization provided herein involve determining, for a multimedia network such as the example network of FIG. 1, whether one or more multimedia endpoints are located behind FW/NAT devices, as described below in connection with the example process of FIG. 2. If so, then the type of FW/NAT device is determined, as described below in connection with the example process of FIG. 3. Based on information about which endpoints are behind FW/NAT devices, and what type of FW/NAT devices are involved, any of a plurality of methods for optimizing a path of media packets communicated between the endpoints can be performed, as described below in connection with the example processes of FIG. 5-1, FIG. 5-2, FIG. 5-3, FIG. 5-4, and FIG. 5-5. The approaches and methods can be implemented, for example, using a general-purpose data processing system of FIG. 4 that is configured and programmed to act as a signaling controller in a multimedia network.

B. Determining Whether Endpoint is Behind FW/NAT

In all cases the SC needs to know whether each endpoint is behind a FW/NAT. This information can be deduced as shown in FIG. 2 and using the following techniques. At the outset, as in FIG. 2, step S210, an SC receives a signaling packet from a particular network IP address X.

1. At step S240, the SC tests whether the payload of the received signaling packet indicates that the endpoint is behind a NAT. If so, then the SC determines that the endpoint sending the signaling packet is behind a FW/NAT; this outcome is represented by symbol A of FIG. 2. For some protocols, such as SIP, data fields which contain IP addresses in various SIP messages may be compared to the source IP address in the IP header of the packet to deduce whether the endpoint is behind a NAT or not. For example, the REGISTER message carries a CONTACT field that contains the SIP URI by which the endpoint can be later contacted. This URI can have the format: "sip:xxx@10.0.0.123:5060," while the source IP of the packet should be a globally routable IP address. Similarly, the Via header field in the SIP message indicates the transport address where responses should be sent, so it can be compared to the actual source IP address the messages was received with.

For MGCP a similar approach can be used as soon as a message with an SDP submessage is sent by the endpoint. This usually happens at the first call in which a particular endpoint is involved. SDP, or Session Description Protocol, describes multimedia sessions for the purpose of session announcement, session invitation and other forms of multimedia session initiation. SDP is defined in IETF RFC 2327. The requested address in the SDP can be compared to the actual transport address, and if they are different then most likely the endpoint is behind a NAT device.

2. At step S230, the SC tests whether the received signaling message was sent to an address and port that are dedicated for marking endpoints that are behind FW/NAT devices. Thus, another semi-automated technique is to dedicate specific server ports or IP addresses on the SC for endpoints that are behind a FW/NAT. For example, SIP endpoints that are behind FW/NAT are provisioned to point to a different port, e.g. 15060 instead of the standard SIP port 5060, or to a dedicated separate IP address. In this approach, the SC can automatically mark such endpoints as behind FW/NAT devices, without having to list them manually.

3. Further, the SC can be provisioned with a list of IP addresses, or pools of IP addresses, of firewall/NAT devices (or the actual endpoints in case there is a FW which does not perform NAT). This is appropriate, for example, for endpoints that are behind a FW that is not performing NAT, in which case the SC has no other way to know the endpoint is masked by a FW. Therefore, at step S220, the SC can test whether address X in the packet received at step S210 is provisioned in the SC as an address that is behind a firewall.

C. Determining Type of FW/NAT Device

The techniques herein also can deduce the type of FW/NAT device that the endpoint is behind. Determining the type of FW/NAT needs to be done only once per FW/NAT and not for every endpoint. Different types of FW/NAT devices include:

1. Full cone—Once a packet goes out and establishes a pinhole, any element from the outside can send traffic back in through that pinhole.

2. Restricted cone—all requests from the same internal IP address and port are mapped to the same external IP address and port. Only external hosts that originally received a message can reply back through the pinhole. Such external hosts can reply from any port.

3. Port restricted cone—the same as a restricted cone FW/NAT, but the external hosts can only reply from the specific port numbers on which they received the message.

4. Symmetric—the most restrictive type, in which all requests from internal IP and port towards a specific IP and port are mapped to the same external IP and port. Only the target IP and port can reply back.

Figure 3:
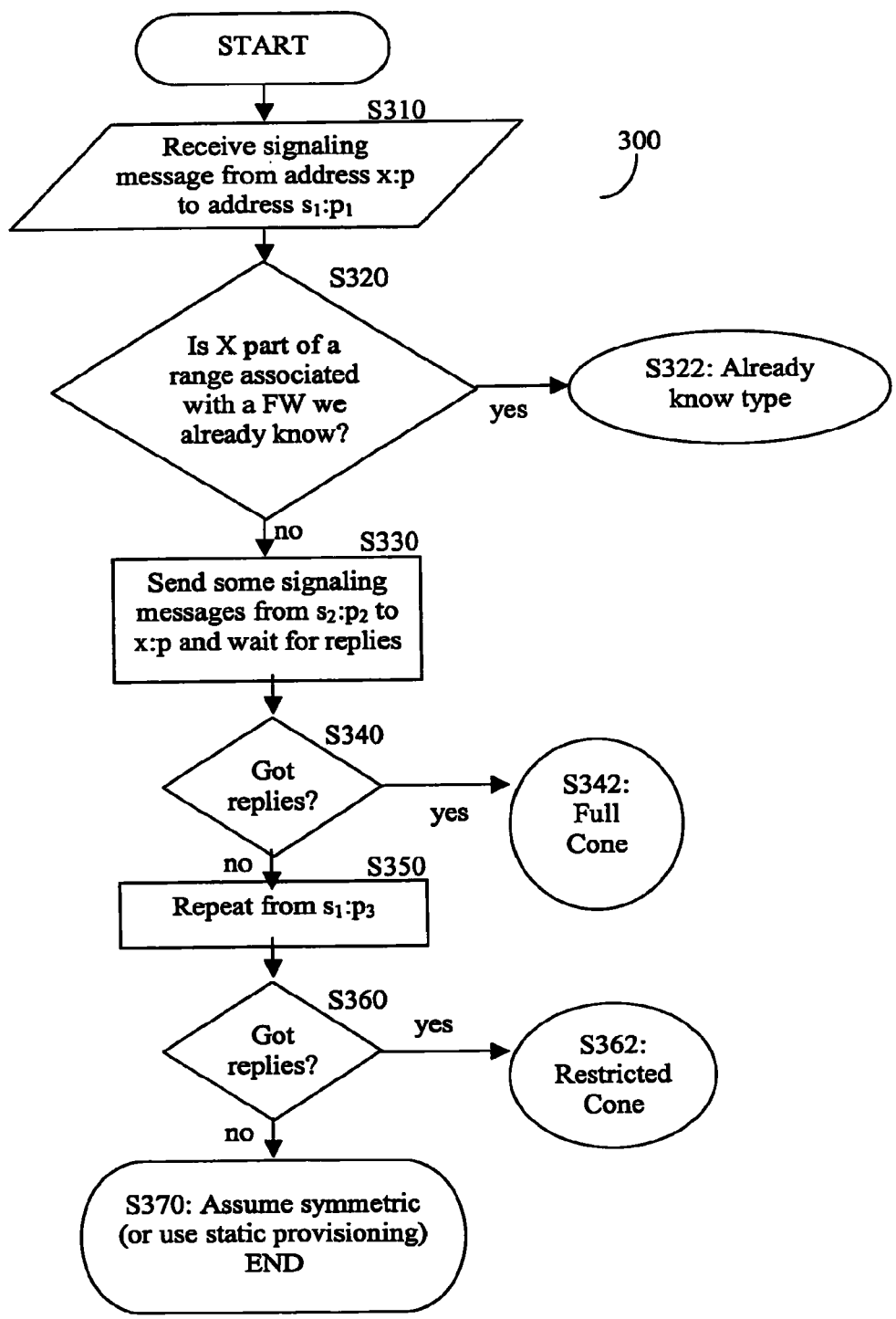
FIG. 3 is a flowchart of an example method for detecting the type of the FW/NAT that an endpoint is behind.

FIG. 3 is a flowchart of an example method for detecting the type of the FW/NAT that an endpoint is behind. In one embodiment, an SC can detect the FW/NAT type as described in FIG. 3 using the following general steps. At step S310, a signaling packet is received from an address and port (x, p) and directed to address and port ($s_1$, $p_1$) on the SC. At step S320, a test is performed to determine if address x is within a range of addresses that are associated with a FW/NAT device that is known to the SC. For example, step S320 may involve performing a table lookup operation in a previously provisioned table of addresses that are known to be behind particular FW/NAT devices. That table can also be populated dynamically with each new FW/NAT that is automatically discovered.

If step S320 is successful, then the SC can determine the type of the FW/NAT device from information stored in the table or in another mapping, as shown by step S322, and no further processing to determine the FW/NAT type is needed. If step S320 fails, then the following further processing is performed.

1. After receiving the initial message from the endpoint, the SC can initiate a query to the endpoint from a secondary IP address that it owns. Thus, at step S330, one or more signaling messages (e.g. a SIP OPTIONS message) are sent from address and port ($s_2$, $p_2$) of the SC to address and port (x, p), and the SC awaits replies. The messages of step S330 are sent towards the original pinhole. If the FW/NAT is full cone, then that message passes through the FW/NAT device, and the endpoint can reply to it, thus confirming this is a full cone FW/NAT, as shown by steps S340, S342.

2. If no reply is accepted, then the SC can initiate another query to the endpoint from its regular IP address, but a different port number. For example, a query message is sent from address and port ($s_1$, $p_3$) of the SC to address and port (x, p), as shown by step S350. If a reply is received, as shown by step S360, then the SC can determine that the endpoint is behind a Restricted Cone FW/NAT (step S362).

3. If no reply is accepted, then the SC assumes the endpoint is behind a symmetric FW/NAT, as shown by step S370.

D. Avoiding Media Flow Hair-Pinning

"Hair-pinning" refers to a flow of communication in which a first or source endpoint sends media through a FW/NAT device to a MC, and the MC relays the media towards a second or destination endpoint which could also be behind a FW/NAT device; thus, the media conceptually performs a hair-pin turn at the MC. This phenomenon can occur when the SC and the endpoints are unaware that both the first endpoint and second endpoint can communicate directly, e.g. when they are behind the same FW/NAT device. Hair-pinning is undesirable because the MC is burdened with unnecessary message processing and because latency is introduced into the multimedia flow. It also forces the media to go through the MC which put additional traffic engineering and bandwidth constraints on the location of the MC. Because multimedia traffic is sensitive to delay, network engineers and administrators seek to provide the most direct path possible between endpoints. Hair-pinning of media can be avoided in various network configuration scenarios, using different techniques to make the media flow directly peer-to-peer in the scenarios, as now described.

1. Global endpoints not behind FW. In case the two endpoints are globally routable, the RTP streams always can be sent directly without the need of the MC. The SC can therefore leave the SDPs unchanged.

2. Two endpoints in the same address space. Two endpoints in the same address space generally can send traffic directly to one another, as in the following example cases:

a. Two endpoints behind a FW/NAT device with a single public IP address—this scenario can be automatically detected, if the FW/NAT has a single public IP address, by comparing the signaling pinhole of each of the endpoints.

b. Two endpoints behind a FW/NAT device with multiple public IP addresses—this scenario may require provisioning the SC with the pool of public addresses of the FW/NAT, which is usually a small subnet.

c. Two endpoints behind a FW device with no NAT—this case is similar to the previous one. The SC is configured with the subnet(s) of the endpoints behind the FW/NAT so that the SC knows they are routable directly from one another.

d. Enterprise with multiple NAT/FW devices—in this scenario a large enterprise with multiple branches can have multiple connections to the Internet, each with its own FW/NAT device. If so, then different endpoints might connect to the SC through different FW/NAT devices. The SC is provisioned with a list of these FW/NAT addresses so that the endpoints behind them can be associated with a single routable network.

e. Two endpoints in the same VPN. The presence of two endpoints in the same VPN can be identified, for example, by the VLAN tag in packets that are received from the endpoints, if tagging is used to segregate different VPNs that are directed towards the same central office.

3. Calls terminated at a global endpoint supporting Comedia. Comedia is an IETF draft standard that is described at the time of this writing in the folder "internet-drafts" of the "ietf.org" domain on the World Wide Web. If a global endpoint A supports Comedia, then the SC can modify the SDP and instruct endpoint A to take a passive role, by setting the SDP going towards it to "active." With this approach, the other endpoint B, whether it is global or behind any type of FW/NAT, initiates sending its media towards the port indicated by endpoint A. Only then the global endpoint A starts sending its media back towards where it received the media, i.e. the pinhole, in case endpoint B is behind a FW/NAT. This will ensure the media from A can reach endpoint B directly.

Comedia can be applied as follows:

a. The SC can be provisioned with a list of all global endpoints supporting Comedia. Whenever an SDP is sent from an endpoint behind a FW/NAT to a Comedia endpoint it will be modified to include "active" in it (and port 9, the discard port, as recommended by the Comedia standard). SDPs coming from the Comedia endpoint towards an endpoint behind a FW/NAT do not need to be modified.

b. Alternatively, global endpoints supporting Comedia can be provisioned to always use the "passive" role when sending out SDPs (they should use it unless first receiving from the other endpoint an SDP indicating "passive").

4. An endpoint that is behind a full or restricted cone FW/NAT communicating with an endpoint which is either global or behind a full or restricted cone FW/NAT. Assume a call is placed from an endpoint A, which is either global or behind a full/restricted cone FW/NAT, to an endpoint B, which is behind a full or restricted cone FW/NAT device.

In this case, the SC can first route the media through the MC to establish the required pinhole(s) through the FW/NAT(s), and then use the acquired pinhole(s) to instruct the endpoints to start sending media directly to the pinhole(s).

Upon receiving the original SDP from each endpoint, the SC requests the MC to allocate an address and port for relaying the media, and then modify the SDP accordingly. When the other endpoint receives the SDP, that endpoint starts sending its media towards the designated address and port on the MC. The MC relays the media towards its destination, and at the same time notifies the SC of the address and port on which the media was received, corresponding to the newly established pinhole. Since the FW/NAT is full or restricted cone, any other host can send traffic to that pinhole in response to first receiving traffic from that pinhole, and the traffic is forwarded to the endpoint. Therefore, the SC can instruct the endpoints to start sending media towards the other side's pinhole, and media will flow directly between the two endpoints. Such an instruction can comprise, for example, sending a new INVITE (re-INVITE) with SDP to each endpoint.

In this scenario, both endpoints are either global or behind a full or restricted cone FW/NAT. This is required because if one of the FW/NAT devices is symmetric, then the pinhole used to send traffic towards the MC is separate from the one that was established by the new direct media going to the FW of endpoint B. In that case, the old pinhole would time out fairly quickly, and media towards the endpoint would not reach it.

5. Calls terminated at a Comedia endpoint behind full cone FW/NAT. Assume a call from an endpoint A that supports Comedia and is behind a full cone FW/NAT and any other endpoint B (even behind a symmetric FW/NAT).

The SC initially instructs endpoint A to send media to an allocated IP address and port on the MC. After learning the new pinhole, the SC can instruct endpoint B to start sending media to that pinhole and can then instruct endpoint A to become passive. Endpoint A then starts sending media directly towards endpoint B (or the FW/NAT pinhole in front of it) as soon as A receives a first media packet from B.

6. Calls terminated at a Comedia endpoint behind restricted cone FW/NAT. Assume a call is placed from an endpoint A that supports Comedia and that is behind a restricted cone FW/NAT and any other endpoint B (even behind a symmetric FW/NAT).

As in a previous case, the SC acquires a pinhole for endpoint A by using the MC. The SC then instructs endpoint A to send media towards endpoint B (or its pinhole) in order to add endpoint A to the list of hosts that can send traffic back in, maintained at the FW/NAT device associated with endpoint B. The SC then instructs endpoint B to start sending media to the pinhole of endpoint A, and eventually the SC instructs endpoint A to become passive.

On occasion, relaying the media through the MC is required even if avoiding hair-pinning is feasible, due to other requirements. For example, a particular application may need to transcode the media, or tap into the RTP streams. These functions are performed at the MC.

Networks can include multiple SCs and multiple MCs. In the most general case, two endpoints that try to establish a call may be associated with different SCs, as shown in FIG. 1, which is described further below. Each SC holds information about its associated endpoint, including whether the endpoint is behind a FW/NAT, the type of the FW/NAT, the pinhole used for signaling, etc. Further, if an SC decides to anchor the media through an MC, then the SC also modifies the SDP, so that downstream SCs (and Call Control Servers) would not know the original SDP parameters.

However, in most cases good management requires designating one SC as an "owner" of a call to determine whether hair-pinning is set up, and that controls the session so that media is routed directly. That owner generally needs the original SDP information, as well as information about the two endpoints. Obtaining this information involves an exchange of information between the two SCs. The exchange can be performed using an out-of-band protocol, but an easier option is to carry the information within the signaling protocol itself. For example, with SIP, the SC that changes the SDP can also embed within the SDP, e.g., as attribute fields ("a=" fields), the original SDP parameters that were changed. With this approach, the downstream SC can restore the original values of the SDP, if the downstream SC decides that hair-pinning can be avoided and media can be routed directly peer-to-peer.

In the foregoing techniques, each endpoint behind a FW/NAT is associated with an SC. Global endpoints can also be associated with SCs, but such an association is not required.

For endpoints that are behind a FW/NAT, the techniques herein assume that media is always going out from the endpoint, because otherwise an endpoint cannot establish a pinhole in the FW/NAT device, and media cannot be sent back in. For uni-directional calls, the SC can artificially instruct the endpoint to send media towards the MC and can instruct the MC not to forward the media anywhere.

These techniques also assume that the SC changes the SDP to point the media to an MC when the SC first receives the message from an endpoint A that is behind a FW/NAT device. There is no need to change an SDP from a global endpoint; if traffic from that endpoint eventually goes to a FW/NAT-ted endpoint then the SC associated with that endpoint makes the required modifications. However, for simplicity the first SC may still change the SDP upon receiving it from the global endpoint.

At the time the SC changes the SDP, the SC generally does not know the destination endpoint B, as most likely the message will be forwarded to a call control server that will make the call routing decision, identify the destination endpoint, etc. Therefore, at that time the SC does not know if hair-pinning prevention can be applied or not. The techniques herein provide for changing the SDP so soon because in at least in some cases, there is no opportunity to modify the SDP at any later time. For example, if a call from an endpoint A behind a symmetric FW/NAT eventually goes to a global endpoint B with no Comedia support, then the media will have to come through the MC, but the SDP might be forwarded from the SIP server directly to endpoint B without going through an SC and therefore the SDP will still point to the private address of endpoint A.

In some cases, the SC cannot identify case 3 above, involving a global Comedia endpoint. For example, consider a call from endpoint A behind a FW/NAT device to a global Comedia endpoint B that is not associated with an SC. In general, this case can be identified in the following way. The SC is provisioned with information specifying that endpoint B supports Comedia, and the SC examines the second leg of the call once the SDP is received back from endpoint B. Only then can the SC send a new SDP towards endpoint B requesting it to be "passive," and freeing the associated address and port in the MC.

In another approach, the global Comedia endpoints could be configured always to work as "passive." In this case, the SC will not know about such configuration and will not remove the unused address and port association from the MC.

Identifying whether the two endpoints behind FW/NAT devices are in the same address space can be performed just before the SDP is forwarded to endpoint B. At this point, the SC can restore the original SDP and terminate any other operation related to that call, such as waiting to learn the pinhole for re-INVITEs, etc.

Consider the case where two endpoints A and B are associated with two different SCs, respectively designated $SC_A$ and $SC_B$. For example, a network topology may comprise a first SC 120-1 and a second SC 120-2 as shown in FIG. 1. When an INVITE with SDP goes from A to $SC_A$, $SC_A$ changes the SDP to point to some media controller designated $MC_A$. Eventually the INVITE reaches $SC_B$. If $SC_B$ also changes the SDP to point the media to another media controller $MC_B$, then eventually media between the endpoints will flow through both MCs. The call is still established correctly, but in general, better performance results from not routing media through multiple MCs. To achieve this goal, $SC_B$ could be configured to determine that the call is already routed through a SC that is capable of preventing hair-pinning In one approach, $SC_B$ is informed using out-of-band signaling between the SCs or, more easily, by $SC_A$ embedding some additional information within the SDP (or SIP message) itself.

Further, when hair-pinning is to be applied, a SC will have to change the SDP to point back to the local address of endpoint A, or use one of the other techniques described above.

E. Signaling Controller Association to Endpoints

Whether a signaling controller is associated with a particular endpoint affects media processing according to several different cases that are now described.

1. Endpoint B is not associated with an SC. In this case, the endpoint is global; all FW/NAT-ted endpoints are assumed to be associated with an SC. If the call is uni-directional, then the SC will force the call to be bi-directional, either by modifying an SDP going towards it from endpoint B or by generating an SDP on its own.

When the initial INVITE from endpoint A is forwarded, the SC does not know the final destination of the message. The initial INVITE is usually forwarded just to the upstream SIP server. The SC can determine the actual destination endpoint B only when the SDP is received from the other side. If endpoint B is on the list of global Comedia endpoints, then the SC can send endpoint B another SDP with "active," to make sure that endpoint B ignores the previous SDP, and assumes a "passive" role in which it starts sending media back to its origin.

Otherwise, if endpoint A is behind a full cone or restricted cone FW/NAT, then the SC first needs to learn the pinhole of endpoint A. To do so, the SC first needs to change the SDP towards endpoint A to point media to the MC. Once media is sent and the SC knows the endpoint, the SC can instruct endpoint A to start sending media directly to global endpoint B. At the same time, the SC can instruct endpoint B to start sending its media directly towards the pinhole. By this time, endpoint B is already on the list of permitted hosts, if the FW/NAT is a restricted cone FW/NAT.

In the case of a restricted cone FW/NAT, and when the call was unidirectional towards endpoint A, endpoint A is instructed to send media to endpoint B to the discard port 9. This instruction is maintained only for a short time to induce adding endpoint B to the list of permitted hosts.

2. Endpoint B is associated with the same SC as endpoint A. This case involves several sub-cases that are now described.

2.1 Endpoints A and B are in the same address space (or global). The SDP, which was modified earlier by the SC, contains an address and port on the MC that can serve as a unique key to various information, including the signaling pinhole of endpoint A. The SC now knows the signaling pinholes of both endpoint A and endpoint B, and can determine if the pinholes are in the same address space. If so, the SC can restore the original SDP, again using the same key as above to initially store that information when the SDP is first changed.

Alternatively, the SC uses the method described below, for the case where the call goes through two separate SCs, to actually communicate all the required information, such as the original SDP, etc.

2.2 Endpoint B is a global Comedia endpoint. In this case, the SC receives the modified SDP (for example, back from the upstream SIP server) before the SDP reaches endpoint B. Therefore, the SC can change the SDP to contain an "active" indication, which will cause endpoint B to take a "passive" role and wait for media before sending it back. The SC also removes the address and port allocation from the MC, because these values are not required.

2.3 Endpoints A and B are behind a full or restricted cone FW/NAT. The SC operates according to case 1, taking advantage of the fact that the NAT is not symmetric to learn the pinhole and to let the endpoints send their media peer-to-peer.

2.4 Endpoint B is a Comedia endpoint behind a full cone FW/NAT. The SC changes the SDP towards endpoint B to contain "active," which will cause endpoint B to wait for media before sending the SDP back. The SC then instructs endpoint B to send media.

3. Endpoints A and B are associated with different SCs. As in an earlier case, to be able to prevent hair-pinning in this case, the two SCs exchange information such as the original SDP so the original SDP can be restored if hair-pinning avoidance is possible. An independent protocol for communication between the SCs can be used to exchange such information. Alternatively, the information is embedded in-band within the signaling messages. For example, in the case of SIP the SC can embed the information within an "a=" (attribute) field in the SDP. With the information available to the second SC, operation proceeds as in the case of a single SC, described in case 2 above.

F. Generalized Media Path Optimization Method

According to one embodiment, a media path optimization method also involves the following steps as performed by a signaling controller. Example methods for optimizing the media path between two endpoints under various conditions are described. The steps described below may be implemented using software elements hosted by the SC, hardware elements of the SC, or any combination that results in performing the described steps.

The first step, which is identical in all cases, is for the SC to change the SDP upon receiving the SDP from an endpoint directly associated with the SC. For example, the SC receives an address-port pair (for RTP and RTCP streams, which use consecutive port numbers) from a MC, and modifies the SDP to point to that address and port. The SC also makes any other modifications required on the message, e.g., to ensure all fields are within the required address space, to ensure that future messages towards endpoint A will come back through this SC, etc. For example, such modifications can include the processes described in co-pending U.S. patent application Ser. No. 10/993,665, filed Nov. 20, 2004, entitled "METHOD OF COMMUNICATING PACKET MULTIMEDIA TO RESTRICTED ENDPOINTS," of Shai Mohaban et al., the entire contents of which are hereby incorporated by reference as if fully set forth herein. Further, the SC adds the original SDP information into the "a=" (attribute) field along with the FW/NAT type of endpoint A, signaling pinhole information (which might be needed to detect e.g., if the two endpoints are behind the same firewall), the SC pinhole prevention capabilities, etc.

If endpoint A is a global Comedia endpoint, then no relay is required. Therefore, the SC can either indicate in the SDP that the endpoint is a Comedia endpoint, or change the SDP to "passive." In this approach, the other SC also will not modify the SDP.

Figure 2:
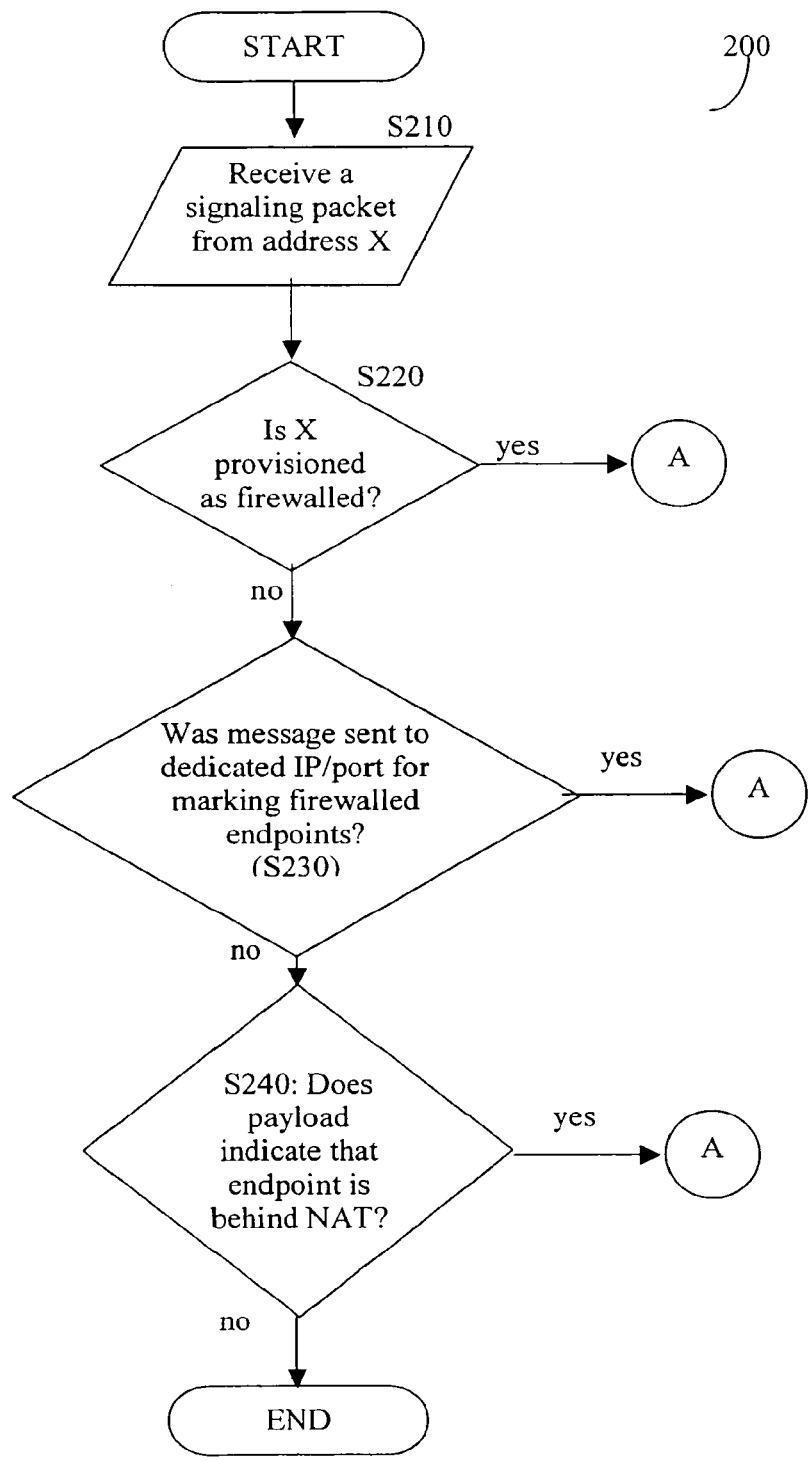
FIG. 2 is a flowchart of an example method for detecting whether an endpoint is behind a firewall or network address translation (FW/NAT) device.
Figure 4:
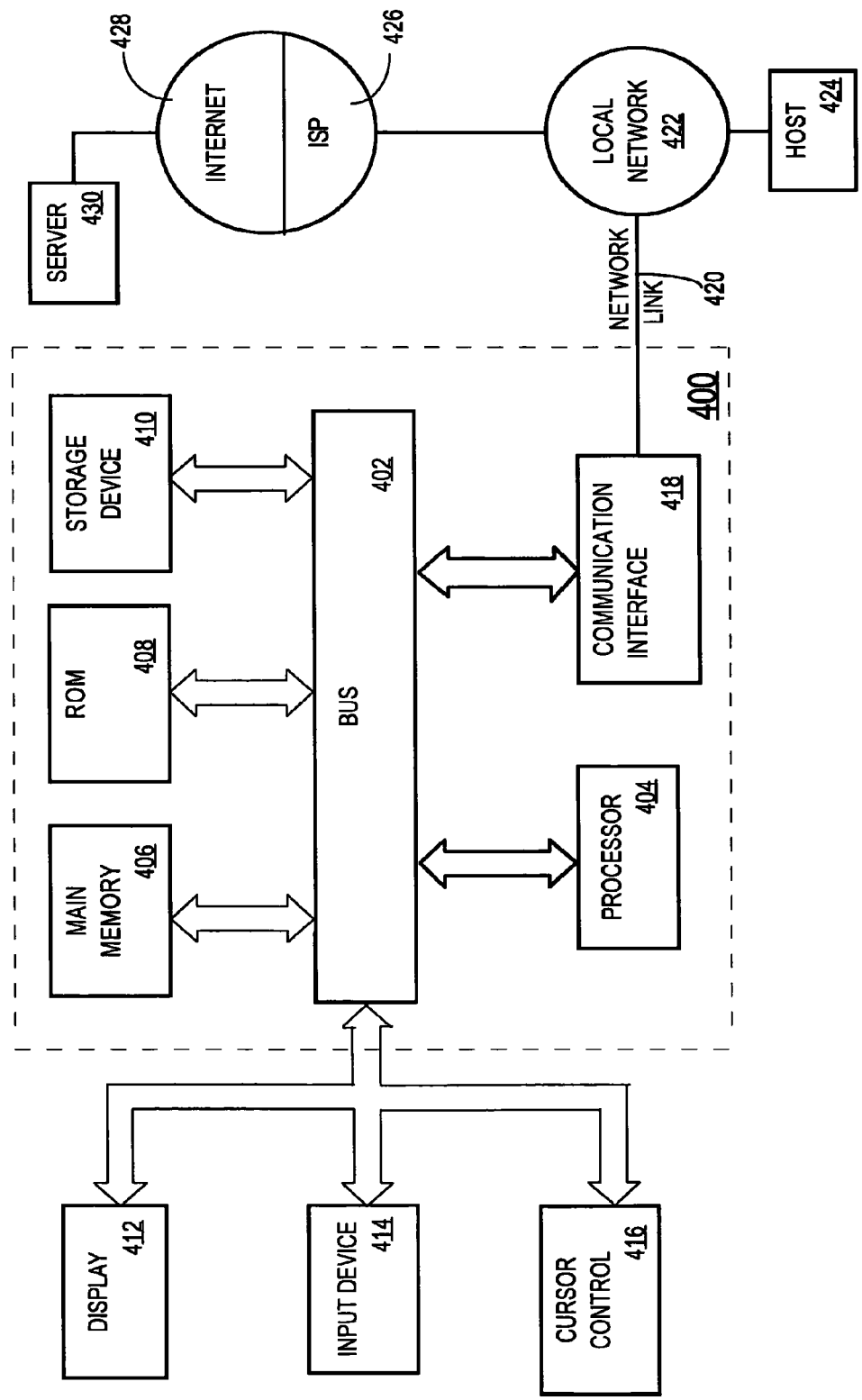
FIG. 4 is a block diagram that illustrates a computer system upon which an embodiment may be implemented.
Figures 1, 5:
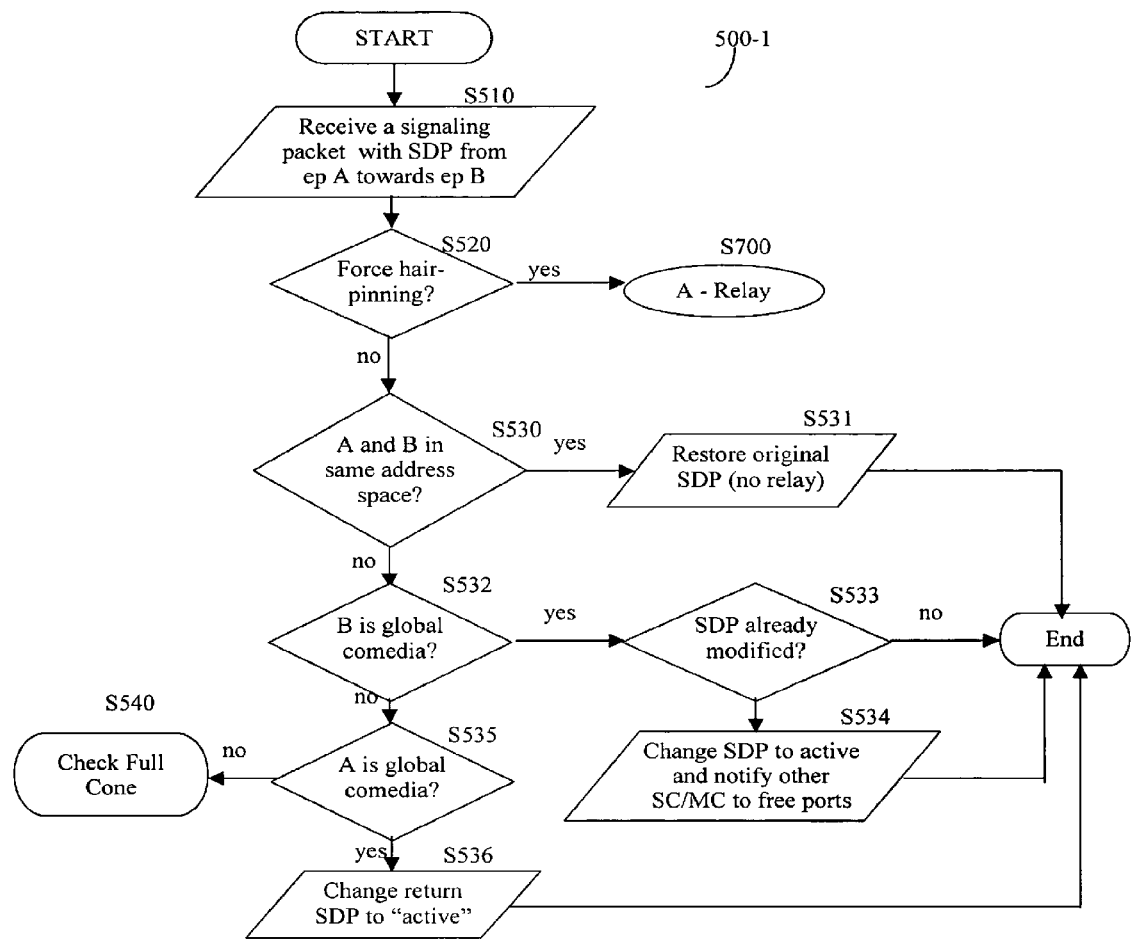
Figures 2, 5:
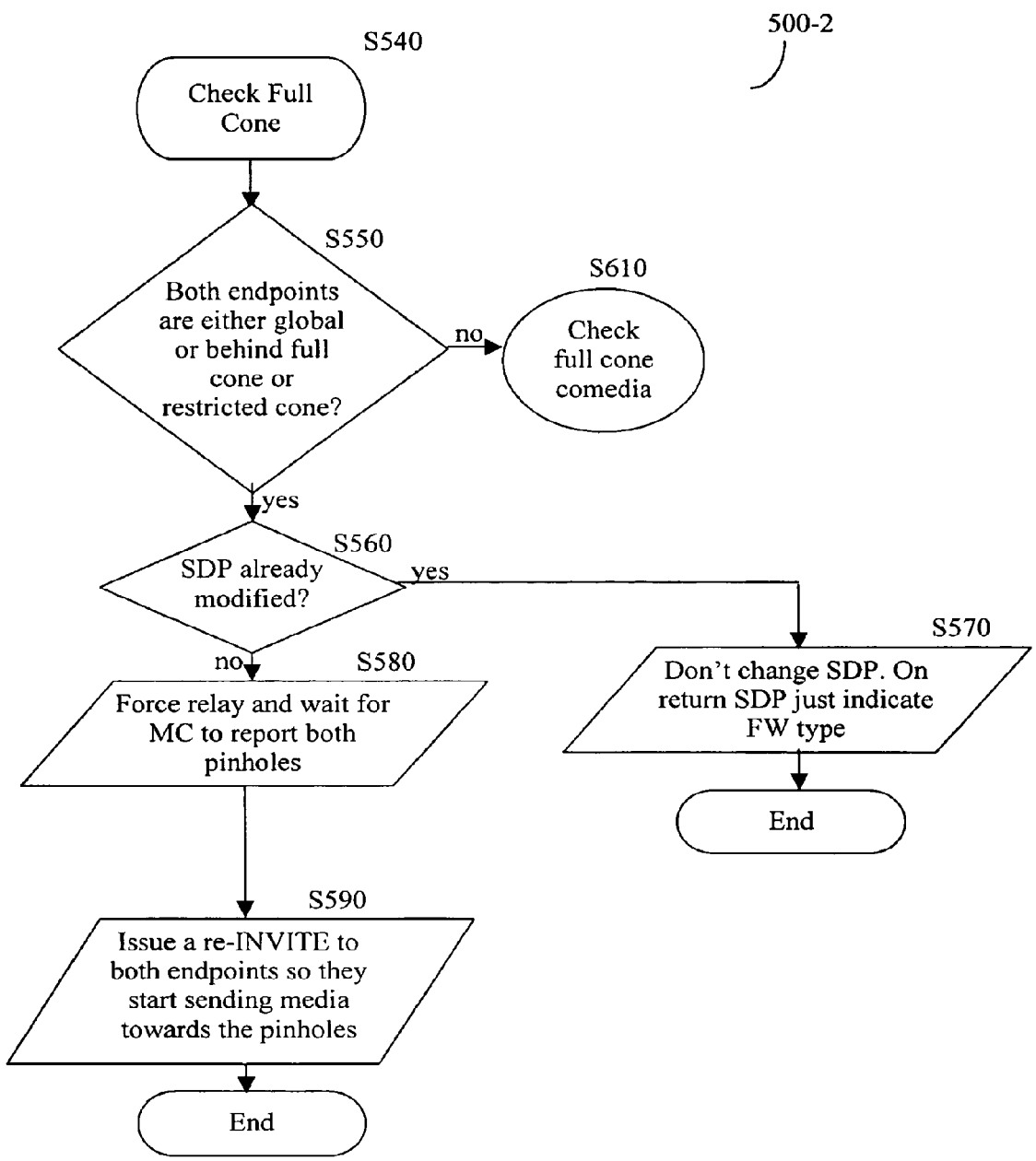
Figures 3, 5:
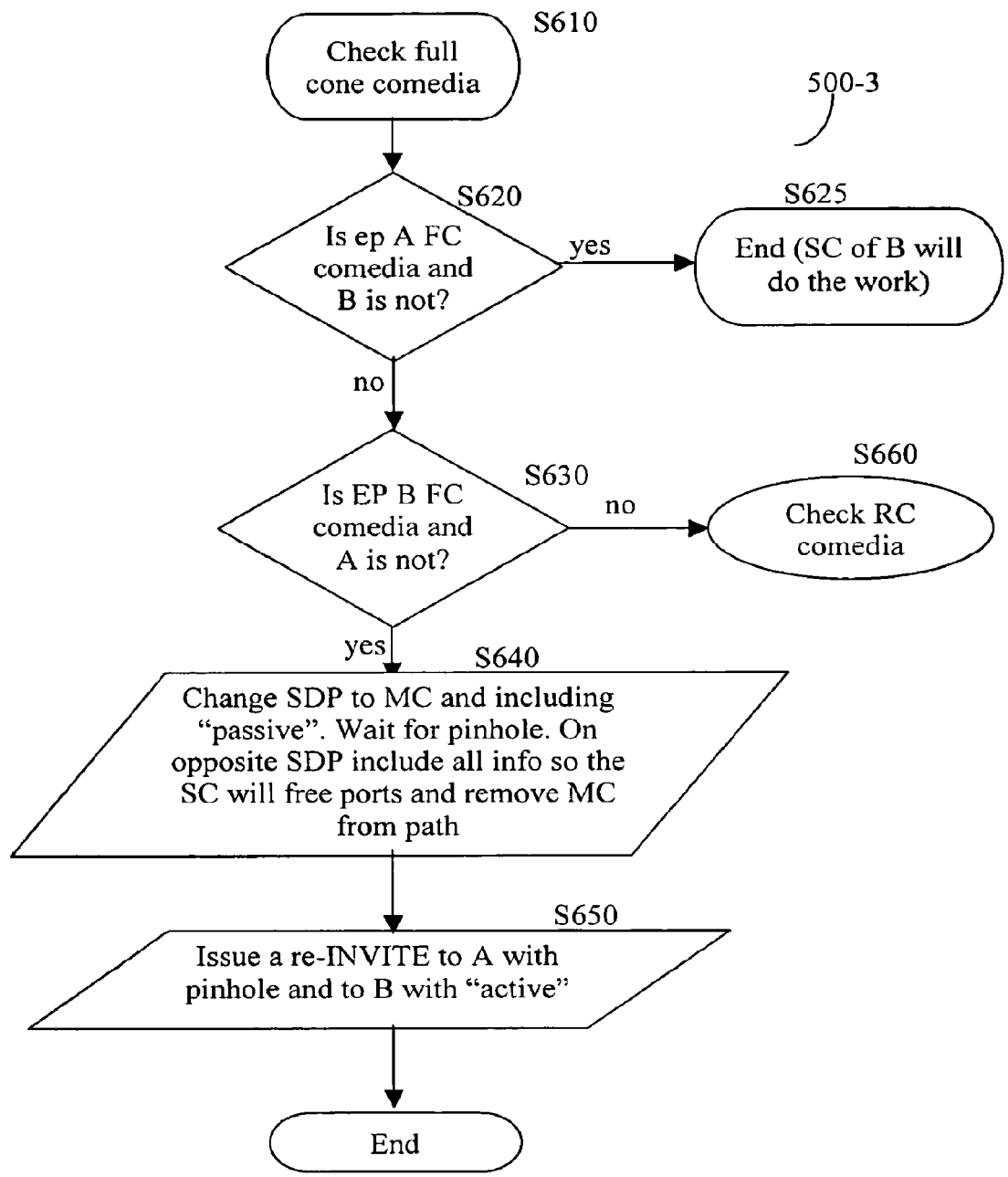
Figures 4, 5:
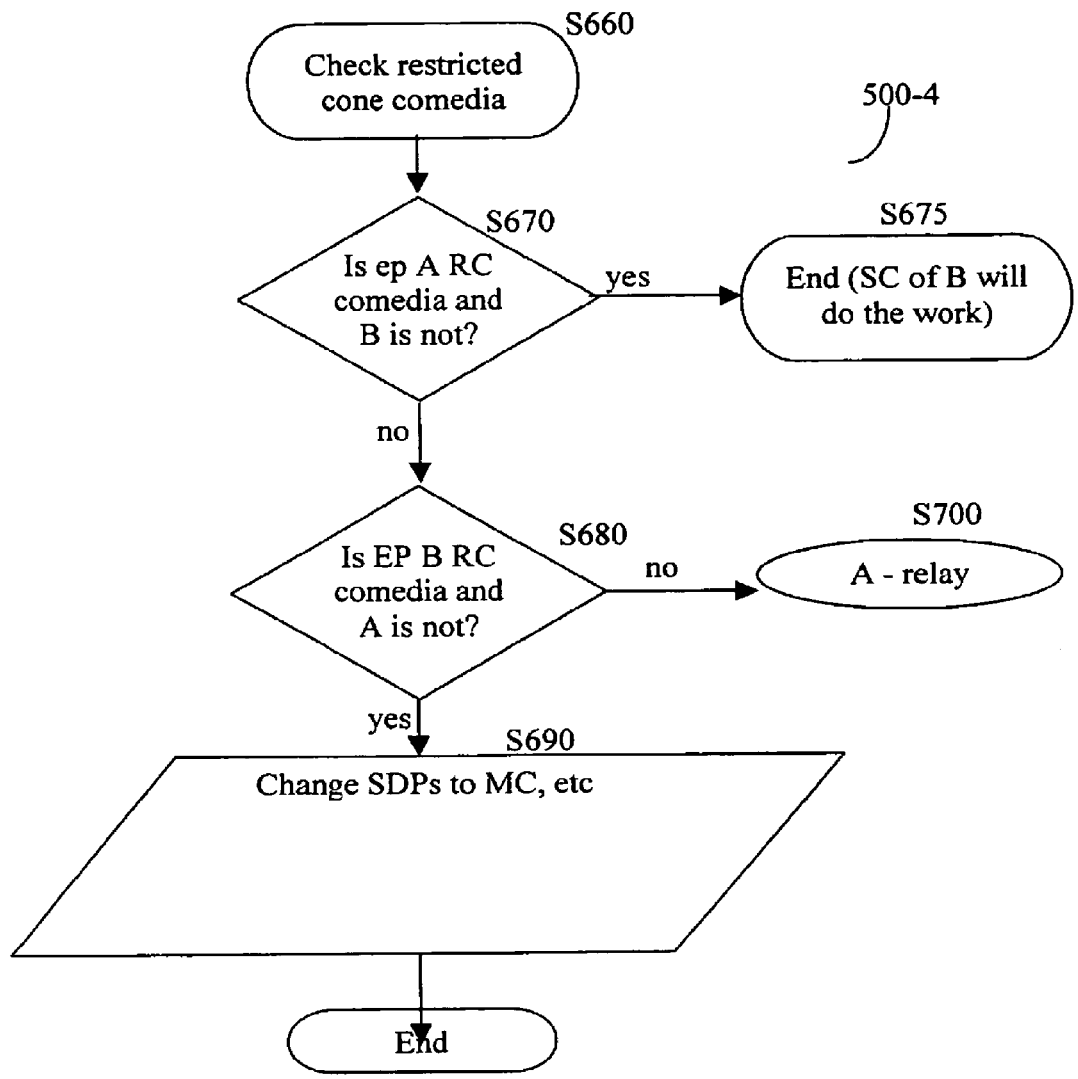
Figure 5:
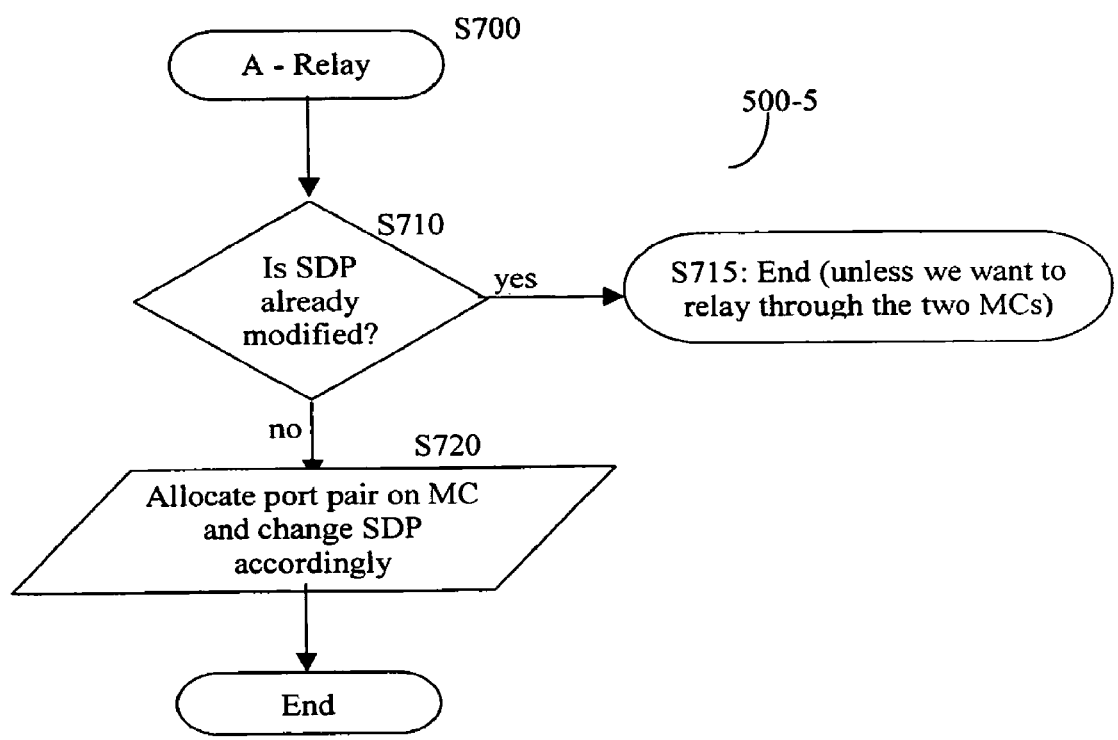

The additional steps are shown in FIG. 5-1 to FIG. 5-5 as performed by a signaling controller. FIG. 5-1, FIG. 5-2, FIG. 5-3, FIG. 5-4, and FIG. 5-5 are flowcharts of example methods for optimizing the media path between two endpoints under various conditions.

Referring to FIG. 5-1, at step S510, a signaling packet is received by the SC with an SDP from a first endpoint A directed towards a second endpoint B which is directly associated with the SC. For example, endpoints A, B may correspond to endpoints 110-1, 110-2 of FIG. 1.

a. Check if hair-pinning should be forced and if so use an MC for the media (FIG. 5-1 step S520, step S700; FIG. 5-5).

b. Otherwise, if endpoints A and B are not behind FW/NAT (and therefore they are in the same address space as tested at step S530), then restore the original SDP (step S531), because there is no need for hair-pinning.

c. Otherwise, if endpoints A and B are routable from one another (and therefore they are in the same address space as tested at step S530), then restore the original SDP (step S531). This is performed, for example, when the endpoints A, B are in the same VPN, or behind the same FW/NAT device.

d. Otherwise, if endpoint A or B supports Comedia and is global, as tested at steps S532 and S535, then employ the technique described in case 3 above:

i. If B is a global Comedia endpoint (step S532), then change the SDP to "active" as in step S534 and notify the MC (and possibly the other SC) to free the port pair (step S533). If the SDP was not changed before, then A is global, and no changes are required (no relay).

ii. Otherwise, if A is a global Comedia endpoint as tested in step S535, which may be determined by pre-provisioning such information into the SC, or by the SDP being "passive", or as indicated by the SC adding this info to the SDP when it arrived from A, then no relay is required. The SDP coming back from B is changed to "active" (step S536).

e. Otherwise, if endpoint A or B is behind a full or restricted cone FW/NAT and the other endpoint is global or behind a full or restricted cone FW/NAT, then the technique described in 4 above is employed (FIG. 5-2, step S540, step S550):

i. If both A and B are associated with SCs (so that the SDP is already modified, as tested at step S560), then the SC of A is the owner of the call, as it originally changed the SDP. In this case, the SC of B leaves the SDP unchanged (step S570). The SDP coming back from B is modified only to include the firewall type.

ii. Otherwise, if the SC of B is the owner of the call, because endpoint B generated the original INVITE or if endpoint A is global and not associated with an SC, then the SC of B allocates ports on an MC, changes the SDP to point to these ports, and waits for the MC to report the pinholes for the media of the endpoints. As shown in step S580, this approach forces a relay and waits for the MC to report both pinholes. The SC of B then issues a re-INVITE towards both endpoints to point their media directly to the pinholes (step S590). It can also instructs the MC to free the previously allocated resources.

f. Otherwise, if endpoint A or B supports Comedia, and is behind a full cone FW/NAT, then the technique described in case 5 above is employed (FIG. 5-3, step S610):

i. If A is the Comedia endpoint (and B is not, because otherwise the previous case applies) and is behind a full cone FW/NAT, as tested at step S620, then the SC for A leaves the SDP unchanged and allows the other SC to handle the call, assuming the other SC is capable of handling the call (step S625).

ii. Otherwise, if B is the Comedia endpoint (and A is not) and is behind a full cone FW/NAT, as tested at step S630, then allocate ports at an MC, change the SDP to relay the media through the MC, include "passive" in the SDP so that B does not wait for the media, and wait for the pinholes to be established (step S640). In the SDP going back towards A, include information sufficient to inform the other SC that it is not the owner of the call; in response, the other SC frees its MC ports and removes its MC from the media path. Once the pinhole is known, issue a re-INVITE to endpoint A, and let it send the media directly to the pinhole (S650). Also issue a re-INVITE to endpoint B, to make it passive by including "active" in the SDP. As a result, endpoint B waits with its media until it receives media from endpoint A.

g. Otherwise, if endpoint A or B supports Comedia, and is behind a restricted cone FW/NAT then employ the technique described in case 6 above (FIG. 5-4, starting at step S660):

i. If A is the Comedia endpoint (and B is not) and is behind a restricted cone FW/NAT, as tested at step S670, then leave the SDP unchanged and let the other SC handle the call, assuming it is capable (step S675).

ii. Otherwise, if B is the Comedia endpoint (and A is not) and is behind a restricted cone FW/NAT, as tested at step S680, then as shown at step S690, allocate ports on an MC, change the SDP to relay the media through the MC, include "passive" in the SCP so that B does not wait for media, and wait for the pinhole to be established. On the SDP going back towards A, include the information needed so that the other SC knows it is not the owner of the call. In response, the other SC frees its MC ports and removes its MC from the media path. Once the pinholes for both sides are known, issue a re-INVITE to endpoint B with "passive" and let endpoint B send its media directly to the pinhole of endpoint A.

Note that the media might not be forwarded to the endpoint itself, as the local firewall could be symmetric. However, sending a packet to that local firewall will cause it to be added to the list of elements that is permitted to send traffic towards endpoint B.

Finally the SC would send a re-INVITE to endpoint A, and let A send the media directly to the pinhole of B. Also issue a re-INVITE to endpoint B to make it passive by including "active" in the SDP. As a result, endpoint B will wait with its media until B receives media from endpoint A.

h. Otherwise (as shown in FIG. 5-5, step S700), if the SDP is not yet modified then allocate a pair of ports at a MC and change the SDP to point to the MC and relay the RTP traffic between the two endpoints (S720). If the SDP was already modified then it is not necessary to modify it again, unless it is required to anchor the media through both MCs, in which case the SDP can be modified again to further route the media through a second MC, as indicated by step S715.

Table 1 presents a summary of whether hair-pinning is prevented using the techniques herein for various scenarios.

TABLE 1

SUMMARY OF HAIR-PINNING PREVENTION SCENARIOS:

| NETWORK SCENARIO | PREVENTION? |
| --- | --- |
| Same address space | yes |
| Global - Global | yes |
| Global - full cone | yes |
| Global - restricted cone | yes |
| Global - symmetric | no |
| Full cone - global | yes |
| Full cone - full cone | yes |
| Full cone - restricted cone | yes |
| Full cone - symmetric | no |
| Restricted cone - global | yes |
| Restricted cone - full cone | yes |
| Restricted cone - restricted cone | yes |
| Restricted cone - symmetric | no |
| Symmetric - global comedia | yes |
| Symmetric - full cone comedia | yes |
| Symmetric - restricted cone comedia | yes |
| Symmetric - symmetric comedia | no |

FIG. 1 is a schematic block diagram of a MoIP network configured in accordance with an embodiment. Network system 100 includes a network 150, which comprises any form of network, including, but not limited to, one or more local area networks (LANs), wide area networks (WANs), and internetworks. Multimedia endpoints 110-1, 110-2 are connected to network 150. Endpoints 110-1, 110-2 broadly represent end-users or equipment used by end-users such as personal computers, workstations, wireless devices, IP phones, etc. Typically, endpoints 110-1, 110-2 are connected through FW/NAT devices 115-1, 115-2 to call control server (CCS) 140. However, connection through FW/NAT devices is not required and system 100 can have a mixture of device configurations.

In a typical voice over Internet protocol (VoIP) application, an endpoint 110-1 may wish to initiate a call to endpoint 110-2. Such a communication may involve the traversal of information over network 150 including the necessity to traverse through multiple FW/NAT devices 115-1, 115-2. Such a communication is performed under the control of CCS 140. CCS 140 may be a call control server of the type commercially available from companies including, but not limited to, Alcatel (for example, the series 1000 switching systems), BroadSoft (the BroadWorks™ servers), Siemens (series HiQ) and Sylantro. Network 150 may have one or more CCSs 140.

However, communicating through multiple FW/NAT devices requires enabling the call control signaling packets to reach the called entities that are behind the FW/NAT devices. Such communication also requires holding open a media communication throughout the duration of the conversation, which may extend beyond timeout periods of any one of the FW/NAT devices on the route. It is therefore necessary to address the issue of FW/NAT timeout periods in a manner that will allow communication throughout the period of connectivity of endpoints 110-1, 110-2 through network 150.

In one embodiment, network 150 further comprises signaling controllers (SCs) 120-1 and 120-2 and media controllers (MCs) 130-1 and 130-2. The SC 120 and MC 130 are configured in the manner described e.g. in application 60002-0521. In one embodiment, SC 120 and MC 130 comprise devices that are commercially available from Kagoor Networks, Inc., San Mateo Calif., such as the VoiceFlow™ series, for example, the VoiceFlow 1000 and VoiceFlow 3000.

SC 120 is connected to network 150 and is capable of high-speed processing of signaling requests. SC 120 is responsible for signal processing, namely, processing the control signals respective of MoIP applications, primarily for the purpose of maintaining FW/NAT device pinholes open throughout the duration of the MoIP communication period. A more detailed description of signal processing by SC 120 is provided below.

MC 130 is also connected to network 150 and operates under the control of SC 120. Specifically, MC 130 handles all media packets of a MoIP transmission under the command of SC 120. MC 130 offloads from SC 120 the processing of packets that require very limited processing, such as media packets that only need to be relayed.

Multiple SCs 120 and MCs 130 may be placed in different geographical locations throughout network 150. One SC 120 may control one or more MCs 130, and one or more SCs 120 may control one MC 130.

All endpoints 110-1, 110-2, etc. are directed to SC 120, which is configured and serves as an outbound signaling proxy for the endpoints. Endpoints 110-1, 110-2 therefore send signaling packets to SC 120. In contrast, in conventional practice endpoints 110-1, 110-2 would direct signaling packets to CCS 140. SC 120 maintains signaling channels with endpoint 110-1, 110-2 and also communicates with CCS 140 to form the desired VoIP communication. Different endpoints 110 can be associated with different SCs. For example, endpoint 110-1 can be associated with SC 120-1 while endpoint 110-2 can be associated with SC 120-2.

G. Implementation Mechanisms—Hardware Overview

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for media path optimization for multimedia over Internet Protocol. According to one embodiment of the invention, media path optimization for multimedia over Internet Protocol is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for media path optimization for multimedia over Internet Protocol as described herein.

The received code may be executed by processor 404 as it is received, and/or stored in storage device 410, or other non-volatile storage for later execution. In this manner, computer system 400 may obtain application code in the form of a carrier wave.

H. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method comprising:
    receiving, at a network address and/or port value of a signaling controller, a signaling packet from a first endpoint located in a voice-over-Internet-Protocol (VoIP) network, wherein the signaling packet contains a Session Description Protocol (SDP) message and is directed towards a second endpoint, and wherein the network address and/or port value of the signaling controller are designated for use by endpoints that are behind any FW/NAT device;
    determining, based at least on the signaling packet, first information specifying whether the first endpoint is logically located behind the FW/NAT device;
    determining, based at least on a payload of the signaling packet and the first information, second information specifying the type of the FW/NAT device; and
    modifying the SDP message or a return SDP message received by the signaling controller to reconfigure, based at least on the first information and the second information, any one of the first endpoint, the second endpoint, one or more signaling controllers and media controllers, and one or more firewall or network address translation (FW/NAT) devices to permit communicating media packets between the first endpoint and the second endpoint using a direct route, wherein the direct route bypasses the one or more signaling and media controllers, while continuing to communicate signaling packets to the one or more signaling controllers.

2. The method of claim 1, wherein the re-configuring permits the endpoints to communicate with other nodes in the VoIP network using standard multimedia signaling and media protocols.

3. The method of claim 2, further comprising determining the second endpoint is logically located behind a second FW/NAT device.

4. The method of claim 1, wherein the re-configuration allows multimedia endpoints and call control servers residing in disparate VoIP networks to communicate to one another without modifying any of network topology, connectivity and security.

5. The method of claim 1, wherein modifying the SDP message comprises:
    modifying a payload of the SDP message to conform the signaling packet to one or more network requirements and to a signaling protocol;
    if the endpoint is not a global Comedia endpoint, allocating a port pair on a media controller and modifying the SDP to point to the media controller; and
    forwarding the packet to a destination entity.

6. The method of claim 5, wherein additional information is embedded in the modified signaling message.

7. The method of claim 6, wherein the additional information comprises any of (a) one or more original SDP parameters and (b) a type of the FW/NAT that the first endpoint is behind.

8. The method of claim 1, wherein re-configuring comprises:
    determining that neither the first endpoint nor the second endpoint are global Comedia endpoints;
    determining that at least one endpoint is not global and that both the first endpoint and the second endpoint are either global endpoints or are located logically behind full-cone or restricted-cone FW/NAT devices;

relaying media between the first endpoint and the second endpoint through a media controller; and receiving report messages from one or more media controllers, wherein the report messages identify pinholes in the FW/NAT devices; and requesting the first endpoint and the second endpoint to send media toward the pinholes identified in the report messages.

9. The method of claim 1, wherein the re-configuring comprises:

determining that neither the first endpoint nor the second endpoint are global Comedia endpoints;

determining that one or neither of the first endpoint and the second endpoint are either global endpoints or are located logically behind full-cone or restricted-cone FW/NAT devices;

determining that the second endpoint is a Comedia endpoint located behind a full-cone FW/NAT device and that the first endpoint is not;

modifying the SDP message to identify a media controller and to specify "passive" operation;

receiving pinhole information from media controller;

generating a second SDP message that includes the pinhole information and other information sufficient to cause a signaling controller associated with the first endpoint to free ports and remove a media controller from a path for media communicated from the first endpoint to the second endpoint; and requesting the first endpoint to direct media based at least on the pinhole information;

requesting the second endpoint to use "active" operation.

10. The method of claim 1, wherein the re-configuring comprises:

determining that neither the first endpoint nor the second endpoint are global Comedia endpoints;

determining that one or neither of the first endpoint and the second endpoint are either global endpoints or are located logically behind full-cone or restricted-cone FW/NAT devices;

determining that the second endpoint is a Comedia endpoint located behind a restricted-cone FW/NAT device and that the first endpoint is not;

modifying the SDP message to identify a media controller and to specify "passive" operation; receiving pinhole information;

generating a second SDP message that includes the pinhole information and other information sufficient to cause a signaling controller associated with the first endpoint to free ports and remove a media controller from a path for media communicated from the first endpoint to the second endpoint; and requesting the first endpoint to direct media based at least on the pinhole information;

requesting the second endpoint to use "active" operation.

11. A non-transient computer-readable storage medium comprising instructions to cause a programmable processor to:

receive, at a network address and/or port value of a signaling controller, a signaling packet from a first endpoint located in a voice-over-Internet-Protocol (VoIP) network, wherein the signaling packet contains a Session Description Protocol (SDP) message and is directed towards a second endpoint, and wherein the network address and/or port value of the signaling controller are designated for use by endpoints that are behind any FW/NAT device;

determine, based at least on the signaling packet, first information specifying whether the first endpoint is logically located behind the FW/NAT device;

determine, based at least on a payload of the signaling packet and the first information, second information specifying the type of the FW/NAT device; and modifying the SDP message or a return SDP message received by the signaling controller to re-configure, based at least on the first information and the second information, any one of the first endpoint, the second endpoint, one or more signaling controllers and media controllers, and one or more firewall or network address translation (FW/NAT) devices to permit communicating media packets between the first endpoint and the second endpoint using a direct route, wherein the direct route bypasses the one or more signaling and media controllers, while continuing to communicate signaling packets to the one or more signaling controllers.

12. The non-transient computer-readable storage medium of claim 11, wherein the instructions further cause the programmable processor to:

determine that neither the first endpoint nor the second endpoint are global Comedia endpoints;

determine that at least one endpoint is not global and that both the first endpoint and the second endpoint are either global endpoints or are located logically behind full-cone or restricted-cone FW/NAT devices;

relay media between the first endpoint and the second endpoint through a media controller; and receive report messages from one or more media controllers, wherein the report messages identify pinholes in the FW/NAT devices; and requesting the first endpoint and the second endpoint to send media toward the pinholes identified in the report messages.

13. The non-transient computer-readable storage medium of claim 11, wherein the instructions further cause the programmable processor to:

determine that neither the first endpoint nor the second endpoint are global Comedia endpoints;

determine that one or neither of the first endpoint and the second endpoint are either global endpoints or are located logically behind full-cone or restricted-cone FW/NAT devices;

determine that the second endpoint is a Comedia endpoint located behind a full-cone FW/NAT device and that the first endpoint is not;

modify the SDP message to identify a media controller and to specify "passive" operation;

receive pinhole information from media controller;

generate a second SDP message that includes the pinhole information and other information sufficient to cause a signaling controller associated with the first endpoint to free ports and remove a media controller from a path for media communicated from the first endpoint to the second endpoint; and request the first endpoint to direct media based at least on the pinhole information;

requesting the second endpoint to use "active" operation.

14. The non-transient computer-readable storage medium of claim 11, wherein the instructions further cause the programmable processor to:

determine that neither the first endpoint nor the second endpoint are global Comedia endpoints;

determine that one or neither of the first endpoint and the second endpoint are either global endpoints or are located logically behind full-cone or restricted-cone FW/NAT devices;

determine that the second endpoint is a Comedia endpoint located behind a restricted-cone FW/NAT device and that the first endpoint is not;

modify the SDP message to identify a media controller and to specify "passive" operation;

receive pinhole information;

generate a second SDP message that includes the pinhole information and other information sufficient to cause a signaling controller associated with the first endpoint to free ports and remove a media controller from a path for media communicated from the first endpoint to the second endpoint; and request the first endpoint to direct media based at least on the pinhole information;

requesting the second endpoint to use "active" operation.

15. A method comprising:

receiving a signaling packet from a first endpoint located in a voice-over-Internet-Protocol (VoIP) network, wherein the signaling packet contains a Session Description Protocol (SDP) message and is directed towards a second endpoint;

determining, based at least on the signaling packet, first information specifying whether the first endpoint is logically located behind the FW/NAT device;

determining, based at least on a payload of the signaling packet and the first information, second information specifying the type of the FW/NAT device; and modifying the SDP message or a return SDP message received by the signaling controller to reconfigure, based at least on the first information and the second information, any one of the first endpoint, the second endpoint, one or more signaling controllers and media controllers, and one or more firewall or network address translation (FW/NAT) devices to permit communicating media packets between the first endpoint and the second endpoint using a direct route, wherein the direct route bypasses the one or more signaling and media controllers, while continuing to communicate signaling packets to the one or more signaling controllers.

* * * * *